United States Patent [19]

Biolik et al.

[11] Patent Number: 4,623,517

[45] Date of Patent: Nov. 18, 1986

[54] METHOD OF ANTI-CORROSIVE PROTECTION OF SILICON CARBIDE PRODUCTS

[75] Inventors: Felicjan J. Biolik; Zygmunt A. Morys, both of Katowice, Poland

[73] Assignee: Biuro Projektow Przemyslu Metali Niezelaznych BIPROMET, Katowice, Poland

[21] Appl. No.: 635,487

[22] Filed: Jul. 31, 1984

Related U.S. Application Data

[63] Continuation of Ser. No. 338,143, Jan. 8, 1982, abandoned.

[30] Foreign Application Priority Data

Jul. 7, 1979 [PL] Poland .................................. 216964

[51] Int. Cl.$^4$ ........................................... B01J 11/18
[52] U.S. Cl. ........................................... 422/40; 427/431
[58] Field of Search ............... 427/228, 345, 226, 431; 428/698; 422/7-9, 1, 40

[56] References Cited

U.S. PATENT DOCUMENTS

| | | | |
|---|---|---|---|
| 1,906,963 | 5/1933 | Heyroth | 427/431 |
| 3,653,851 | 4/1972 | Gruber | 423/345 |
| 3,885,059 | 5/1975 | Komatso et al. | 427/431 |
| 4,187,344 | 5/1980 | Fredriksson | 428/698 |
| 4,226,914 | 10/1980 | Terner et al. | 423/345 |
| 4,324,843 | 4/1982 | Brennan et al. | 428/698 |

Primary Examiner—John D. Smith
Assistant Examiner—Janyce A. Bell

[57] ABSTRACT

The invention relates to a not as yet considered kind of corrosion of products made of silicon carbide working in elevated temperatures and discloses a method of preventing this kind of corrosion which begins already at the moderate temperature of about 550° C. and is caused by the formation of carbon monoxide in the pores of the interior of the silicon carbide products in conditions of limited penetration of oxygen into these pores. The disclosed method of preventing this kind of corrosion consists in shielding part of the surface of the mentioned silicon carbide products by perfectly gastight shields or by a protective atmosphere or inversely in enhancing the access of oxygen into the pores of the mentioned product thus diluting the carbon monoxide being formed, by enlarging the number of open pores so that an open porosity of the product exceeding about 40 percent is reached or by providing uniformly distributed channels in the silicon carbide product the total volume of channels being at least about 10 percent of the outer volume of the product.

2 Claims, 6 Drawing Figures

METHOD OF ANTI-CORROSIVE PROTECTION OF SILICON CARBIDE PRODUCTS

This application is a continuation of application Ser. No. 338,143, filed Jan. 8, 1982 now abandoned.

This invention relates to a protection method of silicon carbide products working in an oxidizing atmosphere at elevated temperatures against a special kind of internal corrosion, which takes place in conditions of limited access of oxygen to the pores in the interior of the product and is caused by carbon monoxide formed in the pores.

TECHNOLOGICAL BACKGROUND

There are many methods of preventing or slowing down the corrosion of silicon carbide products working at elevated or very high temperatures in an oxygen containing atmosphere. The heretofore considered corrosion proceeds according to the formula $$SiC + 2O_2 \rightarrow SiO_2 + CO_2$$

In cases where for technological reasons products made of silicon carbide are to be used methods of preventing or slowing down the corrosion by diverse coatings or shields are applied. The Morganite International Limited Company recommends in prospects heating elements made of silicon carbide with coatings of D or L type glazes. A coating with a glaze of the entire surface of diverse ceramic articles working at high temperatures as parts of gas turbines and similar is described in the U.S. Pat. No. 4,159,357. The U.S. Pat. No. 2,003,592 applies as coat a layer of fine silicon carbide crystals bound with a binding agent. The U.S. Pat. No. 4,226,914 discloses a tightly adherent coating on metallic or ceramic substrates, made by plasma spraying of a mixture of finely divided silicon carbide and silicon to be used for rocket nozzles and in other areas where extremely high temperatures are present. According to GFR Pat. No. 2,533,895 the method consists in impregnating the products with a refractory material, preferably containing molybdenium and silicon bisilicide. Porosity of the product is decreased from 30 percent to approx. 5 percent, ensuring a certain degree of resistance to corrosion. The GDR Pat. No. 136,611 includes a two-step impregnation of silicon carbide heating elements. The U.S. Pat. No. 2,943,008 concerns batts supporting ceramic ware in kilns during burning, made among others from silicon carbide, wherein the upper or both the upper and bottom surfaces are covered with a protective ceramic layer to prevent rapid oxidation. All these methods of protecting silicon carbide products aim to prevent or slow down the process of corrosion by oxygen of porous ceramic materials, as silicon carbide among others, working in elevated temperatures. That kind of corrosion occurs in the whole porous body of unprotected products made from silicon carbide. The protective coats and shields substantially limit the oxygen penetration into the pores inside the product.

As we have experienced and now we disclose herewith that under conditions of limited penetration of oxygen into the pores of a silicon carbide products, caused by the above mentioned and not perfectly gestight coatings and shields, another kind of corrosion of silicon carbide products takes place inside the body of the product on places distant from the surface exposed to the oxygen containing atmosphere. This different kind of corrosion of silicon carbide products appears at much lower temperatures than the previous one, it leads to a very rapid destruction of the product and is caused by carbon monoxide formed in the pores under conditions of a very small oxygen concentration. Thus the application of protective coatings and shields, which are not perfectly gastight or have at least a weak point or get rents with time, is extremely detrimental to silicon carbide products.

Below is presented the process of corrosion of silicon carbide products in an oxidizing atmosphere and under conditions of a limited penetration of oxygen into the pores of the product, that is in the case of such an installation of the product that a portion of the total outer surface of the product has been isolated from oxygen to air, as e.g. in a crucible for melting metals the outer face of which is heated, in a thermocouple shield immersed in metal or in a zinc rectification column of a New Jersey system or in the side linings of alumina reduction cells and many other applications.

Under conditions of a limited penetration of oxygen to the pores in the product carbon monoxide is produced as a result of the action of the small concentration of oxygen on trace amounts of carbon always present in silicon carbide products, thus leading to the formation of a strongly reducing atmosphere.

The carbon monoxide reacts with silicon carbide according to the following formulae $$\begin{aligned} C + \tfrac{1}{2}O_2 &\longrightarrow CO \\ SiC + CO &\longrightarrow SiO + 2C \\ \hline SiC + \tfrac{1}{2}O_2 &\longrightarrow SiO + C \\ 2SiO &\longrightarrow SiO_2 + Si \end{aligned}$$

As a result of above reactions silicon dioxide and silicon are produced from a portion of the silicon monoxide and the remaining silicon monoxide is transformed into a solid phase of a brown colour.

The liberated carbon reacts in turn with existing oxygen of low concentration producing further carbon monoxide, which in turn forms silicon monoxide and liberates carbon. Mixture of the listed compounds remains partially in the pores of the product, whereas the remaining portion is deposited on the outer faces of the product. The process leads to a very rapid destruction of the product by rents and cracks.

The rate of corrosion depends first of all on the manner of installation of the product and on its average temperature of work.

According to this pattern the corrosion of silicon carbide products starts already at a temperature of about 550° C.

SUMMARY OF THE INVENTION

The invention deals with a hitherto not considered but experienced by the inventors kind of corrosion of silicon carbide products, which occurs already at moderate temperatures of working in an oxidizing atmosphere caused by carbon monoxide formed in the pores of the product under conditions of limited penetration of oxygen into the pores depending on the manner in which the product is installed, as well as indicates effective and easy to be used protection methods against this kind of corrosion.

This is achieved in cases when a part of the surface of the silicon carbide product is exposed to oxygen containing atmosphere by preventing the formation of carbon monoxide in the pores of the product by shielding the mentioned part of the surface with appropriate perfectly gastight coats of shields or by a neutral gas atmosphere.

This is also achieved in cases where a part of surface of a silicon carbide product or its entire surface is exposed to an atmosphere containing oxygen in low concentration by enwancing the penetration of oxygen into the pores of the product to prevent the formation of carbon monoxide, which is being diluted by an excess of oxygen due to an increased number of open pores in the product or/and to uniformly distributed channels in the whole volume of the product.

In the first case the shield can be made as a protective coating of silicon carbide deposited from the gaseous phase by pyrolisis of a silane compounds such as $CH_3SiCl_3$. We have found that such a coat at least 1 mm thick gives a sufficient protection against the CO-type corrosion of silicon carbide products.

This shield can be made also from porcelain, steatite or other known gastight suitable ceramic materials, or in some cases from metal, particularly alloyed steel.

Also substances in molten state such as salts or glasses can be used for shielding silicon carbide products against an oxygen containing atmosphere.

In the second case we have found that an increased number of open pores in the product giving an open porosity exceeding about 40 percent is sufficient to prevent the mentioned CO-type corrosion. Also at lower porosity of the product we found that if the volume of uniformly distributed channels of various shape in the whole volume of the silicon carbide product is in excess of about 10 percent of the total product volume a sufficient protection against this type of corrosion is reached.

We have made also positive experience with a protective atmosphere of nitrogen.

It is obvious that for any particular case the most economic and suitable protection method should be selected on an experimental way.

The requirements for a suitable protection in any particular case can be defined upon following items: no chemical interaction between the protection and other constituents of the system; perfect gastightness of the shield or coat; sufficient thermal and mechanical resistance; suitable for any particular case thermal or/and electrical conductivity and other properties.

Obviously an universal recipe does not exist.

UTILITY OF THE INVENTION

The invention ensures a considerable extension of the service life of various silicon carbide products, used among others in the non ferrous metals industry as furnace parts, shelves for rectification columns in New Jersey system, shields for thermocouples, fittings for burners as well as in other industries. The invention allows also to increase the scope of utilization of silicon carbide products in the industry, e.g. for side linings of alumina reduction cells, tapping holes and spouts of furnaces and other uses, as well as channel shapes for induction furnaces.

EXAMPLES OF EMBODIMENTS

The method presented in the invention will be explained on examples of embodiments shown in the accompanying drawings, wherein:

FIG. 1 presents the method of anticorrosive protection of a thermocouple shield made of silicon carbide.

Figure 4:
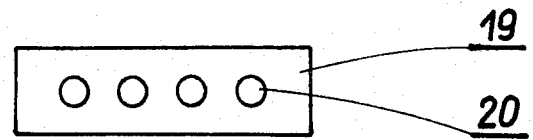

FIG. 4 presents the cross section and

Figure 5:
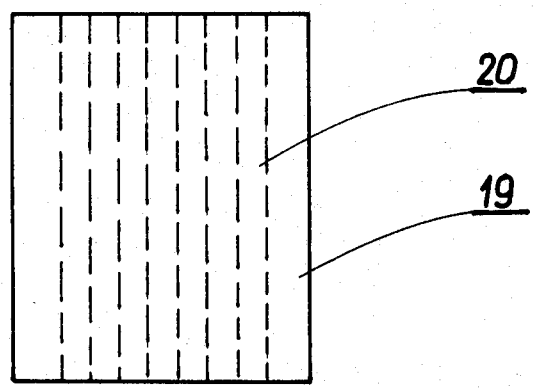

FIG. 5 the view of a thick batt for supporting ceramic wares in kilns during burning, the batt being made of silicon carbide.

Figure 6:
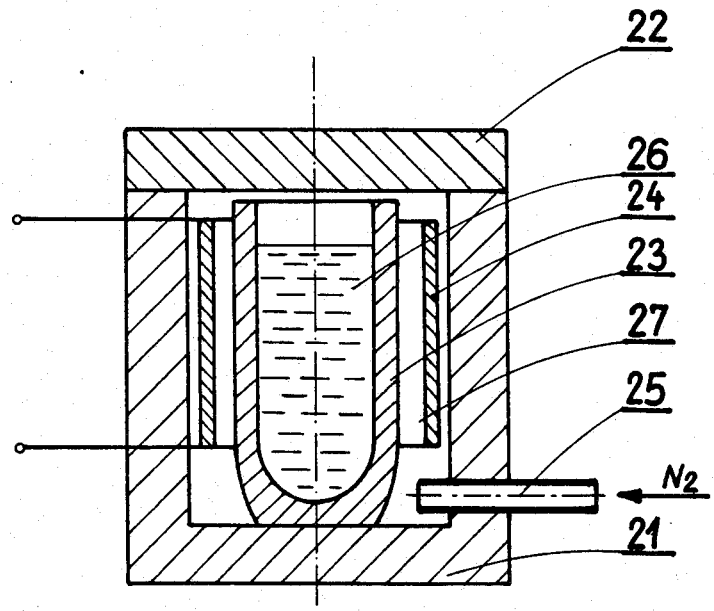

FIG. 6 shows the method of anticorrosive protection of a silicon carbide crucible in a furnace for melting aluminium with heating by metallic heating elements.

Figure 1:
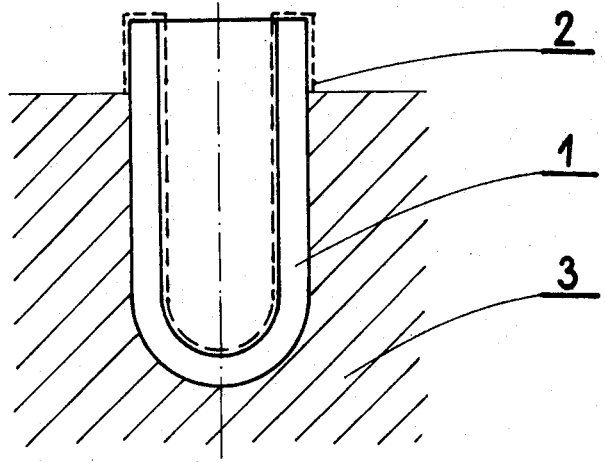

Example I of embodiment of the method according to this invention shown in FIG. 1 relates to a thermocouple shield for measuring the temperature of a copper bath. The shield 1 is made of silicon carbide of an open porosity of 15 percent, the coat 2 at least 1 mm thick is deposited from the gaseous phase by the known method of thermal decompositione/pyrolisis/ at 1400° C. of the silane compound $CH_3SiCl_3$ carried by hydrogen according to the formula $CH_3SiCl_3 + nH_2 \rightarrow SiC + + 3HCl + nH_2$. This coat has a zero porosity, a rather good thermal and electrical conductivity, a high mechanical strength. This coat ensures a full protection against corrosion by means of carbon monoxide formed in the pores of the shield, as this compound cannot be formed at all.

Figure 2:
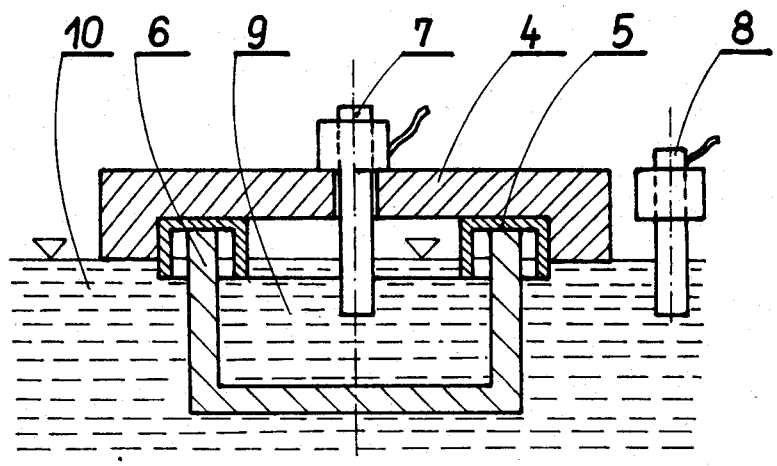
FIG. 2 shows the method of anticorrosive protection of a heating element body made of nitrided silicon carbide in an electric resistance furnace for melting zinc with direct heating of the zinc bath.

Example II of embodiment of the method according to this invention shown in FIG. 2 relates to a heating element used in electric resistance furnaces for melting zinc with direct heating of the zinc bath and consisting of a ceramic weight 4, a C letter shaped porcelain ring 5, a crucible 6 made of nitrided silicon carbide, acting as the heating body, current conductors 7 and 8, zinc bath 9 as contact metal, as well as the heated zinc bath 10, where the crucible 6 is being protected against the mentioned corrosion by means of the porcelain ring 5 being a perfectly gastight shield for the protruding from the zinc baths 9 and 10 faces of the crucible 6 because the bottom edges of this porcelain ring 5 are immersed in the contact metal 9 and heated bath 10. The protective ring 5 is placed on the upper edge of the crucible 6. This solution is a very simple and not expensive method of protecting the silicon carbide crucible against corrosion.

Figure 3:
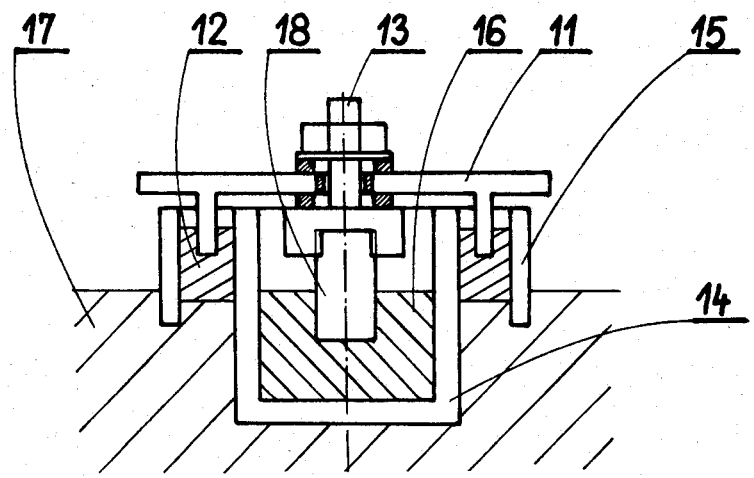
FIG. 3 shows the method of anticorrosive protection of a heating element body made of nitrided silicon carbide in an electric resistance furnace for melting brass bath.

Example III of embodiment of the method according to this invention shown in FIG. 3 relates to a similar heating element consisting of a weight 11 in form of a plate made of a refractory steel, molten barium chloride $BaCl_2$ 12, current feeder 13 with mica sealing, crucible shaped heating body 14, made of nitrided silicon carbide, ring 15 made of silica $SiO_2$, molten aluminum bronze 16 as contact metal, melted and heated brass bath 17 and graphite electrode 18. The barium chloride 12 is hold between the upper part of the outer surface of the crucible 14 and the ring 15. In this solution the gastight shield is made by the steel plate 11 and molten barium. This is an another simply and not expensive method of protection of silicon carbide heating elements against corrosion.

Example IV of embodiment of the method according to this invention in FIGS. 4 and 5 relates to a batt supporting ceramic for example porcelain wares in kilns during burning, wherein the body 19 of the batt has uniformly distributed circular channels 20 enhancing the kiln atmosphere to penetrate freely into the interior of the batt diluting CO formed in the pores and transforming it into $CO_2$.

Example V of embodiments of the method according to this invention shown in FIG. 6 relates to a crucible furnace for melting aluminium consisting of a casing 21, cover 22, silicon carbide crucible 23, metallic heating element 24, gas supply pipe 25, melted aluminium 26 and a heating room 27, wherein the crucible 23 is protected against corrosion by supplying nitrogen as a protective atmosphere for the silicon carbide crucible to the heating room 27 via gas supply stream 25.

While particular embodiments of the invention have been illustrated and described, it will be obvious to those skilled in the art that various changes and modifications may be made without falling off from the invention, and it is intended to cover in the appended claims all such modifications and equivalents as full picture of the true spirit and scope of this invention.

What is claimed is:

1. A method of protecting against corrosion a solid body of silicon carbide submerged in a high-temperature molten bath, comprising the step of placing a separate, unconnected, oxygen-tight shield over at least a part of the submerged surface of said body, said shield consisting of a separate piece of porcelain, steatite, metal or alloyed steel.

2. A method of protecting against corrosion a solid body of silicon carbide submerged in a high-temperature molten bath, comprising the step of placing a separate oxygen-tight shield in molten state over at least a part of the submerged surface of said body, said shield consisting of metal, salt or glass to prevent access of oxygen to said part of the surface.

* * * * *